United States Patent
Wang et al.

(10) Patent No.: US 10,586,560 B1
(45) Date of Patent: Mar. 10, 2020

(54) RHODIUM FILM WITH THIN TEMPLATE LAYER AND ITS APPLICATION TO A THERMALLY ASSISTED MAGNETIC RECORDING (TAMR) WRITER

(71) Applicant: Headway Technologies, Inc., Milpitas, CA (US)

(72) Inventors: Shengyuan Wang, San Jose, CA (US); Weihao Xu, San Jose, CA (US); Cherng-Chyi Han, San Jose, CA (US); Xuhui Jin, Sunnyvale, CA (US); Min Li, Fremont, CA (US); Kunliang Zhang, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/292,457

(22) Filed: Mar. 5, 2019

(51) Int. Cl.
| | | |
|---|---|---|
| *G11B 5/127* | (2006.01) | |
| *G11B 5/64* | (2006.01) | |
| *G11B 5/31* | (2006.01) | |
| *G11B 5/00* | (2006.01) | |

(52) U.S. Cl.
CPC ............ *G11B 5/1278* (2013.01); *G11B 5/314* (2013.01); *G11B 5/64* (2013.01); *G11B 2005/0021* (2013.01)

(58) Field of Classification Search
CPC ......... G11B 5/1278; G11B 5/314; G11B 5/64; G11B 2005/0021
USPC ....................................... 360/123.01–123.06
See application file for complete search history.

(56) References Cited

U.S. PATENT DOCUMENTS

| | | | |
|---|---|---|---|
| 9,177,585 B1 * | 11/2015 | Seki | ................ G11B 5/7379 |
| 9,799,352 B1 | 10/2017 | Chen et al. | |
| 10,026,421 B1 | 7/2018 | Barbosa Neira et al. | |
| 10,121,496 B1 | 11/2018 | Peng et al. | |
| 2017/0221505 A1 | 8/2017 | Staffaroni et al. | |
| 2017/0287513 A1 | 10/2017 | Shimazawa et al. | |

OTHER PUBLICATIONS

"Surface plasmon subwavelength optics," by William L. Barnes et al., Nature Publishing Group, Nature vol. 424, pp. 824-830 (Aug. 14, 2003), www.nature.com/nature.
"Heat-assisted magnetic recording by a near-field transducer with efficient optical energy transfer," by W. A. Challener et al., Nature Photonics, vol. 3, pp. 220-224 (2009), Mar. 22, 2009, pp. 1-5, www.nature.com/naturephotonics.

(Continued)

*Primary Examiner* — Allen T Cao
(74) *Attorney, Agent, or Firm* — Saile Ackerman LLC; Stephen B. Ackerman (57) ABSTRACT

A PMR (perpendicular magnetic recording) head is configured for thermally assisted magnetic recording (TAMR). The thermal energy is supplied by the near-fields of plasmons and the near-fields are directed to a magnetic recording medium by a PPG layer. The PPG layer is Rhodium (Rh) whose small-grained crystal structure normally makes it subject to thermal deformations and other weaknesses. By growing the PPG layer on a thin template layer (TTL), the portion of the PPG layer adjacent to the air-bearing surface (ABS) develops a larger grain size and stronger forces between its atomic constituents which makes it resistant to those deformations.

12 Claims, 5 Drawing Sheets

(56) References Cited

OTHER PUBLICATIONS

"HAMR Recording Limitations and Extendibility," by Xiaobin Wang et al., IEEE Transactions on Magnetics, vol. 49, No. 2, Feb. 2013, pp. 686-692.
L1o-Ordered FePt-Based Perpendicular Magnetic Recording Media for Heat-Assisted Magnetic Recording, by B.S.D.Ch S. Varaprasad et al., IEEE Transactions on Magnetics, vol. 49, No. 2, Feb. 2013, pp. 718-722.
"Optical Design Challenges of Thermally Assisted Magnetic Recording Heads," by Kenichi Takano et al., IEEE Transactions on Magnetics, vol. 46, No. 3, Mar. 2010, pp. 744-750.

* cited by examiner

RHODIUM FILM WITH THIN TEMPLATE LAYER AND ITS APPLICATION TO A THERMALLY ASSISTED MAGNETIC RECORDING (TAMR) WRITER

1. TECHNICAL FIELD

This disclosure relates generally to a thin-film magnetic writer used in perpendicular magnetic recording (PMR) and particularly to its use along with thermally assisted magnetic recording (TAMR) to write on highly coercive recording disks.

2. BACKGROUND

To further increase the magnetic recording density of a hard disk drive (HDD) system, there have been growing demands for the improvements in the performance of thin film magnetic heads. A perpendicular magnetic recording (PMR) head combining a single pole writer with a tunneling magnetoresistive (TMR) reader provides a high writing field and a large read-back signal, thus a higher areal density can be achieved. Increasing the magnetic recording areal density requires smaller grain size in the magnetic recording media, which in turn reduces storage lifetime due to thermal instabilities. In order to maintain durable storage lifetime, the thermal stability (energy barrier $\Delta=KV/k_bT$) has to be increased. In the formula, $k_bT$ is the Boltzmann constant, T is the temperature in Kelvin, V is the average grain size of the storage media, K, magnetic anisotropy, is equal to $H_kM_s/2$, where $H_k$ is the magnetic anisotropy field and $M_s$ is the saturation magnetization of the magnetic recording media. For smaller grain size media, K has to be increased to maintain the same thermal stability for storage, thus $H_k$ is greatly increased causing the magnetic media to have high coercivity $H_c$. As a consequence, the magnetic field generated by the magnetic writer main pole as well as the current from the coil around the main pole may not be strong enough to switch the magnetic media bits for data recording.

To solve this magnetic recording dilemma, thermally-assisted magnetic recording (TAMR) has been introduced. The purpose of TAMR is to use heat energy to reduce the energy barrier ($\Delta=KV/k_bT$) of the grains of the magnetic recording media while writing the data with the magnetic recording field. During data writing, a magnetic bit in the media is heated, causing temperature to rise; then the bit in the media can be reversed in polarity by the applied magnetic field due to a reduction in the energy barrier $\Delta$. Once the bit polarity is changed, both the heating source and the applied field are quickly withdrawn. As the temperature reverts to room temperature, the switched state of the bit is stored in the magnetic recording media.

In present thermally-assisted magnetic recording (TAMR), the heating source is produced by the means of near-field optical radiation. The near-field optical radiation is produced by plasmons excited by irradiation of the light in a metal layer. In TAMR, a laser beam, generated by a laser diode is transmitted through a waveguide at whose distal air bearing surface (ABS) end it couples to a planar plasmon generator (PPG) formed of a conducting metal film surrounded by a dielectric material. Such metal films are able to generate near-fields efficiently by the excitation of surface plasmons (SP), which are resonant surface modes of free electrons bounded within the metal-dielectric interface. Structure and geometry of the PG can be engineered to enable efficient energy transfer from waveguide to PG, to excite local surface plasmon resonance, and to utilize the "lightning rod" effect to further improve field confinement. This kind of metallic nanostructure is referred to as the planar plasmon generator (PPG) or near-field transducer (NFT). The nature of the near-fields is such that they are not subject to diffraction effects and can be focused to a very small spot size where they heat the magnetic media. Typically, the metals used for the PPG are noble metals such as gold, silver, and other highly conductive metals such as copper, and their alloys, due to the large availability of free electrons and the low optical absorption in those metals.

The PPG materials not only need to generate surface plasmons with high efficiency, but they also have to be reliable under high temperature irradiation during TAMR writing process. Under such high temperature irradiation, the materials have to adhere firmly to their dielectric surroundings and do so without any deformations during long time writing processes with heating. The PPG film has to be reliable and durable for multiple TAMR writer processes. The combined requirements of high conductivity, reliability and durability has led to a continuing search for better materials for the PPG structure.

SUMMARY

It will be an aspect of the present disclosure to provide a PMR (perpendicular magnetic recording) writer incorporated within a TAMR (thermally assisted magnetic recording) configuration in which a planar plasmon generator (PPG) film stack has been provided that is reliable and durable for multiple writer processes.

It is a further aspect of the present disclosure that the PPG film stack so provided is an efficient source of surface plasmons (SP).

It is still a further aspect of the present disclosure to provide such a PPG film stack that firmly adheres to its dielectric surroundings.

It is still a further aspect of the present disclosure to provide such a PPG film stack that includes a bottom layer denoted a PPG bottom layer (PBL) and a top layer denoted a PPG top layer (PTL).

It is still a further aspect of the present disclosure to provide such a PBL based on Au and such a PTL based on Rh.

These aspects will be found in a PTL film stack based on a Rh film that is formed over a thin template layer (TTL). The structure so provided will be configured to be operative within a TAMR writer. The claimed TTL will enable a Rh PTL stack to withstand the effects of heating that a TAMR system provides.

To further the implementation of these aspects, the present disclosure provides a process flow to adapt this structure to such a TAMR writer.

DETAILED DESCRIPTION

Figure 1:
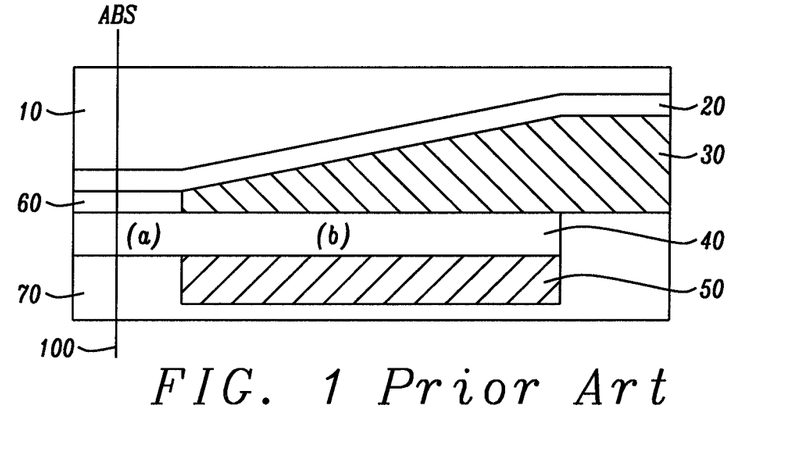
FIG. 1 is a schematic illustration of a cross section view of a typical TAMR writer head of the prior art.

FIG. 1 shows a schematic cross-sectional view in a plane perpendicular to the ABS plane 100 of a portion of an existing (prior art) TAMR writer. The view goes rearward from the ABS plane 100 and passes through the central axis of the device.

There is shown a substrate that includes a planar plasmon generator (PPG) having a top layer (PTL) formed of a Rh film 40. The substrate includes a PBL (PPG bottom layer) Au portion 50 and a bottom step dielectric (BSD) portion 70. The full film PTL Rh film 40 is patterned into two portions, a rod-shaped neck 40(a) that emerges at the ABS plane 100 and a parabolic (in the horizontal plane) main body 40(b). A heat sink layer for the PPG is denoted HPG 30. A main magnetic pole (MMP) 10 is above the PPG and is separated from the PPG by a Peg-Pole spacing layer (PPS) that comprises the pair of layers 20 and 60, with layer 20 also serving as a diffusion barrier layer (DBR).

Portion 40(a), closest to the ABS, is grown contacting a BSD, 70. Portion 40(b) is above and in contact with the PBL Au portion 50. Above the BSD 70, the Rh film 40(a) is patterned as a necked-down narrow rod, as shown, facing the writer ABS direction. The portion 40(b) of the Rh film that is just above the PBL Au portion 50, which is the main body portion of the Rh film, is patterned to have a wider parabolic shape in the horizontal plane (which cannot be seen in this side-view).

It is observed that the portion 40(b) of the Rh PTL above the PBL Au 50 has a textured crystalline structure and large grainsize. On the other hand, the portion 40(a) of the Rh (PTL) above the BSD has less textured crystalline structure and smaller grainsize, which creates weak bonding between the atoms. During TAMR operation, the PTL Rh above the BSD tends to become deformed and oxidized. Such PTL Rh deformation and oxidation create defects and adversely impacts the operational lifetime of the existing TAMR writer.

The PPG material in a TAMR device is typically noble, precious metallic elements from the six platinum-group metals, such as ruthenium, rhodium, palladium, osmium, iridium, and platinum. They are highly resistant to becoming oxidized and being subjected to other chemical attacks. In addition, they display high-temperature thermal stability, and stable electrical properties.

Among the Pt-group metals, Rh is utilized as the PPG material of choice in TAMR devices. It is a hard, durable, and corrosion-resistant metal. It also has good thermal properties, such as high melting point 2237K (or 1964° C.), high thermal conductivity (150 W/(m K)), and low coefficient of thermal expansion ($8 \times 10^{-6}$ $K^{-1}$). Rh is also known for having small electrical resistivity ($4.3 \times 10^{-8}$ mΩ) and small and stable contact resistance.

Figure 2:
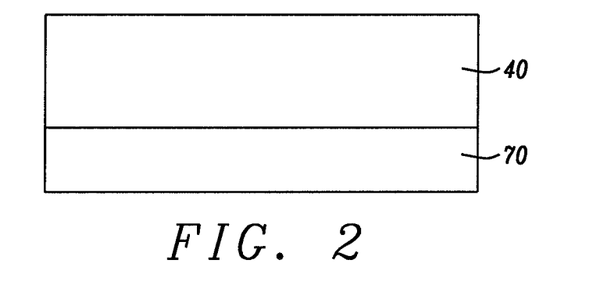
FIG. 2 is a schematic illustration of an existing PTL film formed on an amorphous dielectric spacer in the structure in FIG. 1, such as a spacer of Alumina or SiO2.

Rh has a face-centered cubic (fcc) crystalline structure. Rh 40 grown on the amorphous BSD, 70, (as shown in FIG. 2) tends to be disordered polycrystalline. The grainsize is also small and there is less bonding among the atoms. Due to these weak points, Rh film is easy to become deformed and oxidized upon TAMR device operation.

Figure 3:
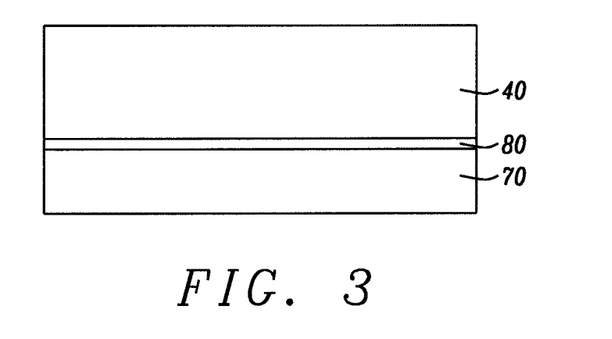
FIG. 3 is a schematic illustration of the presently disclosed PTL structure, which now includes a thin template layer formed between a PTL film and a dielectric spacer, replacing the structure of FIG. 2.
Figure 4:
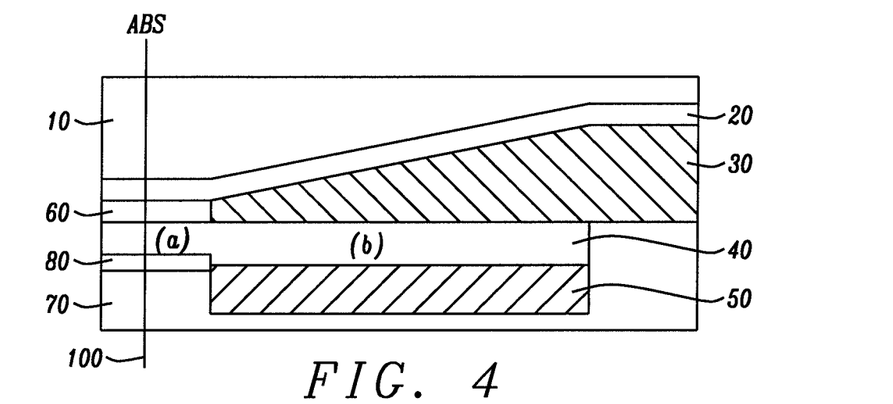
FIG. 4 is a schematic cross-sectional view of the TAMR writer of FIG. 3 with the PTL structure now incorporating this thin template layer (TTL).

Referring now to schematic FIG. 3, we see that the Rh rod-shaped portion 40(a) is grown on a thin template layer (TTL) 80 having an fcc crystalline structure and interposed between the BSD, 70, and the PTL Rh layer 40 (a). Thus the rod shaped portion follows the fcc growth of the TTL, 80, due to the TTL templating (the effect of the TTL crystalline structure to act as a template for material grown on it). With TTL underneath it, PTL Rh film tends to grow with a textured crystalline structure. Grainsize becomes larger and there is a strong bonding among the atoms. Such aspects of the Rh film formed on a TTL will help PTL Rh robustness for reliable TAMR device operation. The TTL in FIG. 3 can be Au-based fcc material to template Rh growth. The thickness of the TLL is from 20 to 300 A FIG. 4 schematically shows a cross-sectional view of a portion of the presently claimed TAMR writer structure. In FIG. 4, the TTL layer 80 is formed between PTL Rh rod 40(a) and the BSD, 70. As can be seen, the portion of the Rh rod 40(a) that is close to ABS and the portion of the Rh body 40(b) above PBL Au are each deposited upon the same Au fcc material underneath, the 40(a) rod portion adjacent to the ABS being on the TTL 80, the 40(b) body portion that is rearward of the rod being in contact with the PBL Au 50. Thus the applied Rh full film, 40(a) and 40(b) will have the same textured crystalline growth due to the fcc Au templating effect. Similarly to FIG. 1, layer 30 serves as a heat sink layer, layer 20 is a diffusion barrier layer and layer 60, combined with layer 20 provide peg-pole spacing (PPS) at the ABS (as will now be seen in FIG. 5).

Figure 5:
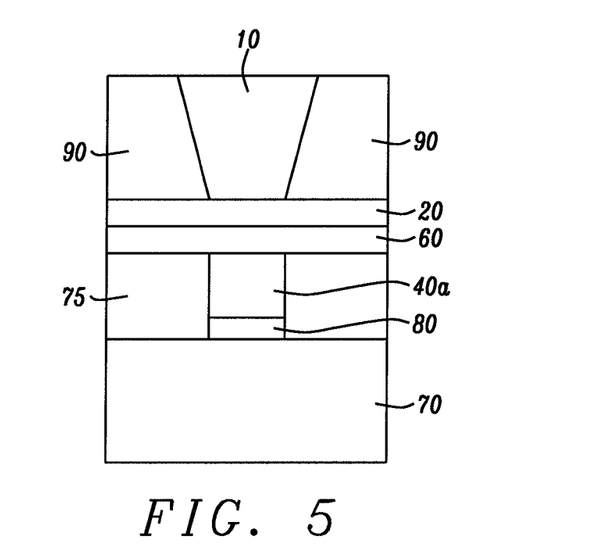
FIG. 5 is a schematic ABS view of the TAMR writer of FIG. 3 with the PTL part having this thin template layer (TTL) formed above dielectric spacer 70 and PBL (PPG bottom layer).

FIG. 5 schematically shows an ABS view of the portion of claimed TAMR writer structure also shown in schematic side cross-sectional view in FIG. 4. In FIG. 5, the TTL layer 80 is shown applied between PTL Rh rod 40(a) and the bottom step dielectric BSD, 70. FIG. 5 also shows that a magnetic main pole (MMP) 10 is partially surrounded laterally by non-magnetic metal that serves as a heat-sink for the MMP (HMP) 90 and that the PTL 40 and TTL 80 are also partially surrounded by the PPG side cladding (PSC) 75 made from the same dielectric materials, such as Alumina or SiO2.

To fabricate this TTL as a part of the claimed structure, the following process steps are introduced.

Figure 6:
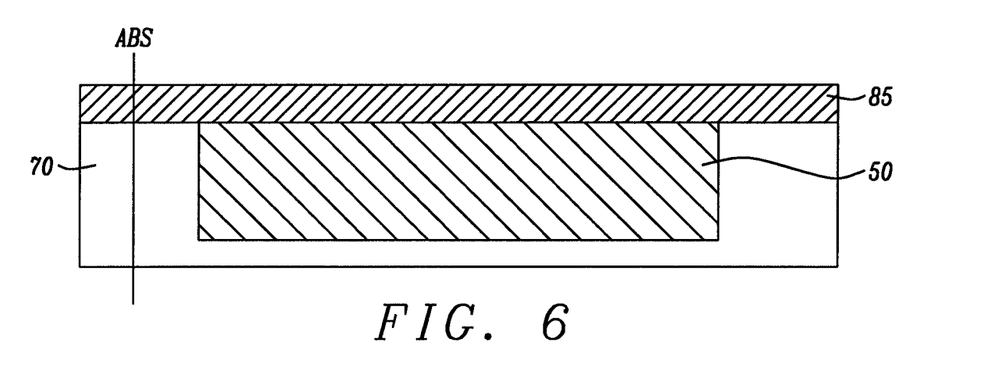
FIG. 6 schematically shows an initial step in the formation of the present structure, specifically there is shown an unpatterned TTL layer being formed above a PBL.

Referring to schematic FIG. 6, there is shown an unpatterned TTL layer 85 applied above the PBL Au 50 and BSD, 70. In one example, a Zr xA/Au yA stack is used as the TTL, in which the Zr thickness x is ~2-10 A and Au thickness y is from approximately 10 A to 300 A. In another example, Zr xA/Au yA/Rh zA stack is used as the TTL, in which the Zr thickness x (in Angstroms, A) is between approximately 2 A-10 A, the Au thickness y is from approximately 10 A to 300 A, and the Rh thickness is between approximately 20 A-100 A. A Zr seed layer is used to enhance the Au film adhesion to the substrate.

Figure 7:
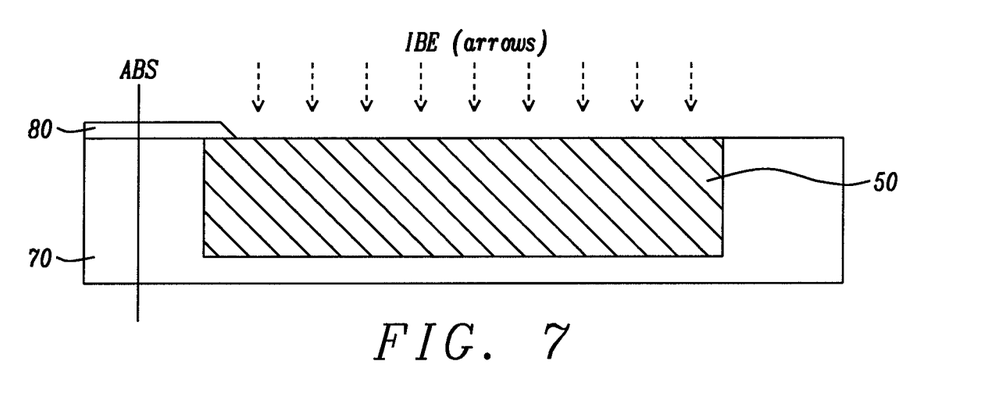
FIG. 7 schematically shows the process flow. In which, the TTL is etched away above the PBL Au portion.

Referring to schematic FIG. 7, a dry-etching photo patterning has been utilized to remove the TTL 85 portion above the PBL Au 50. In this process, an ion-beam etch (IBE) (shown as downward directed arrows) etches through and removes a portion of the TTL above PBL Au. The TTL portion, 80 above the BSD, 70 is kept.

Figure 8:
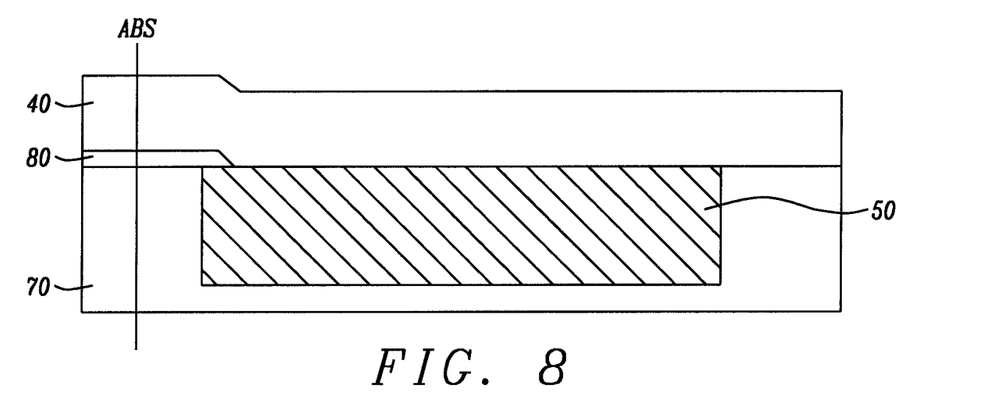
FIG. 8 schematically shows the process flow. In which, the Rh PTL film is deposited.

Referring to schematic FIG. 8, PTL Rh film 40 is deposited on top of the BSH Au 50 and TTL 80.

Figure 9:
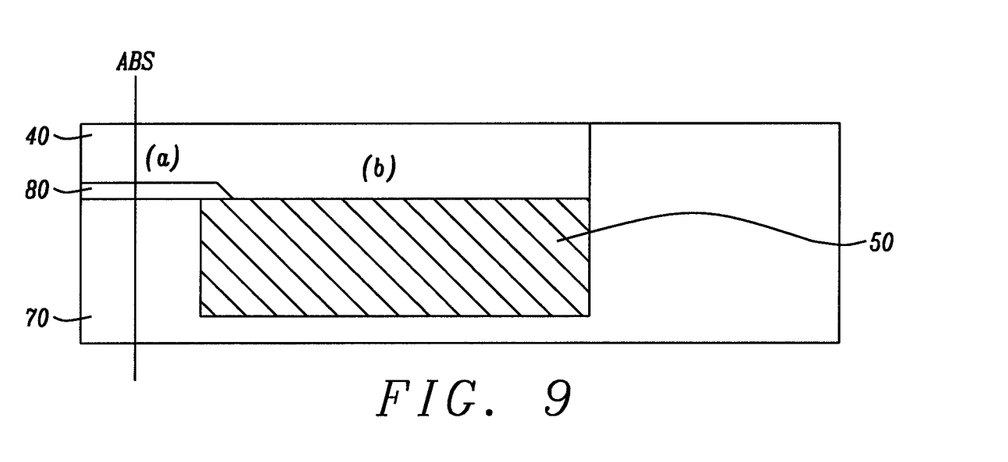
FIG. 9 schematically shows the process flow in which the Rh PTL film is patterned and polished.

Referring finally to FIG. 9, there is shown that PEG Rh 40 has been patterned into a necked-down rod 40(a) and a parabolic body 40(b) and polished to produce the final-dimensioned target shape. Note that the parabolic shape of the body portion is visible only from an overhead view in the horizontal plane and the rod would be seen as emerging from the base of the parabola.

Figure 10:
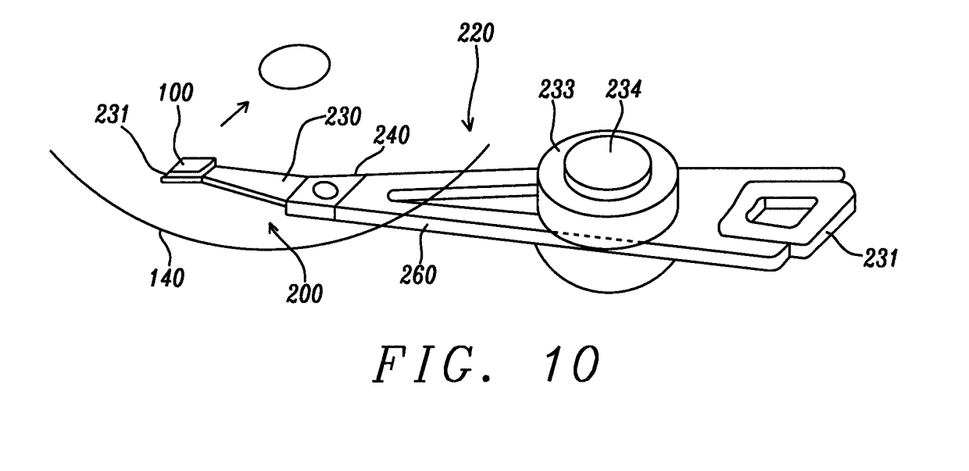
FIG. 10 schematically shows a perspective view of a head arm assembly of the present recording apparatus.
Figure 11:
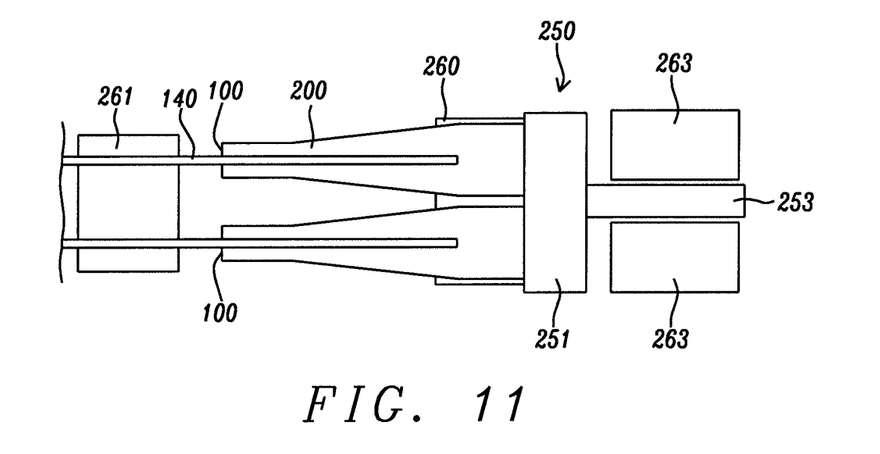
FIG. 11 schematically shows a side view of a head stack assembly of the present recording apparatus.
Figure 12:
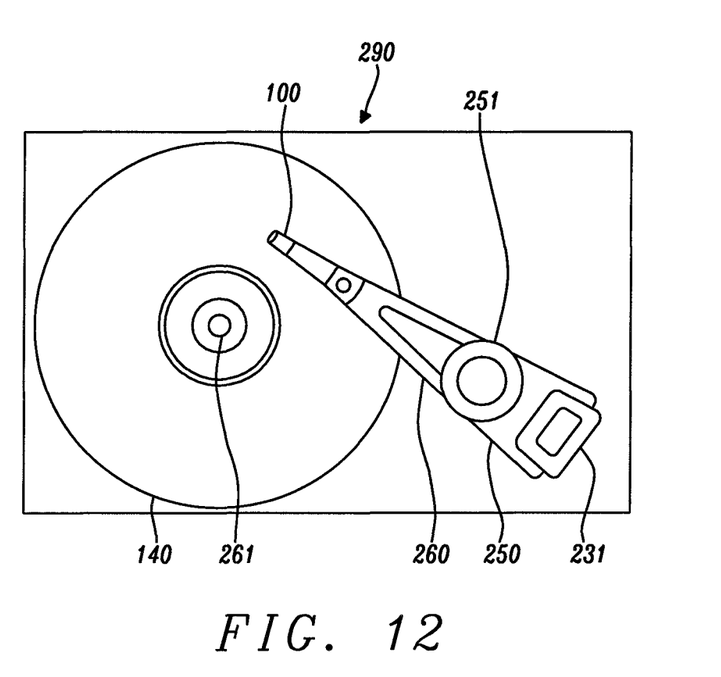
FIG. 12 schematically shows a plan view of the magnetic recording apparatus within which are mounted the components shown if FIGS. 10 and 11.

Referring now to FIGS. 10, 11 and 12, there is shown the elements of an exemplary magnetic recording apparatus, such as a TAMR configured hard disk drive (HDD), through whose use the TAMR writer described above will meet remaining objects of this disclosure.

FIG. 10 shows a head gimbal assembly (HGA) 200 that includes the slider-mounted TAMR writer 100, the slider now providing aerodynamic support to the writer when it moves above or below an operational disk recording medium 140. There is also shown a suspension 220 that elastically supports the slider-mounted writer 100. The suspension 220 has a spring-like load beam 230 made with a thin, corrosion-free elastic material like stainless steel. A flexure 230 is provided at a distal end of the load beam and a base-plate 240 is provided at the proximal end. The slider mounted TAMR writer 100 is attached to the load beam 230 at the flexure 231 which provides the TAMR with the proper amount of freedom of motion. A gimbal part for maintaining the PMR read/write head at a proper level is provided in a portion of the flexure 231 to which the TAMR 100 is mounted.

A member to which the HGA 200 is mounted to arm 260 is referred to as head arm assembly 220. The arm 260 moves the read/write head 100 in the cross-track direction (arrow) across the medium 140 (here, a hard disk). One end of the arm 260 is mounted to the base plate 240. A coil 231 to be a part of a voice coil motor (not shown) is mounted to the other end of the arm 260. A bearing part 233 is provided to the intermediate portion of the arm 260. The arm 260 is rotatably supported by a shaft 234 mounted to the bearing part 233. The arm 260 and the voice coil motor that drives the arm 260 configure an actuator.

Referring next to FIG. 11 and FIG. 12, there is shown a head stack assembly 250 and a magnetic recording apparatus in which the slider-mounted TAMR writer 100 is contained. The head stack assembly is an element to which the HGA 200 is mounted to arms of a carriage having a plurality of arms for engaging with a plurality of disks 140. The plurality of disks are mounted on a spindle 261. FIG. 11 is a side view of this assembly and FIG. 12 is a plan view of the entire magnetic recording apparatus.

Referring finally to FIG. 12, the head stack assembly 250 is shown incorporated into a magnetic recording apparatus 290. The magnetic recording apparatus 290 has a plurality of magnetic recording media 14 mounted on a spindle motor 261. Each individual recording media 14 has two TAMR elements 100 arranged opposite to each other across the magnetic recording media 14 (shown clearly in FIG. 10). The head stack assembly 250 and the actuator (except for the write head itself) act as a positioning device and support the PMR heads 100. They also position the PMR heads correctly opposite the media surface in response to electronic signals.

The read/write head records information onto the surface of the magnetic media by means of the magnetic pole contained therein.

As is finally understood by a person skilled in the art, the detailed description given above is illustrative of the present disclosure rather than limiting of the present disclosure. Revisions and modifications may be made to methods, materials, structures and dimensions employed in forming and providing a PMR writer configured for TAMR operation having a PTL Rh that is formed on a thin template layer (TTL) that strengthens its crystalline structure so that it is resistant to oxidation and deformation during TAMR operation, while still forming and providing such a structure and its method of formation in accord with the spirit and scope of the present invention as defined by the appended claims.

What is claimed is:

1. A PMR writer configured for TAMR operation comprising:
   a main magnetic pole (MMP) emerging at an air-bearing surface (ABS) for recording on a locally heated magnetic medium;
   a source of optically generated plasmons;
   a planar plasmon generator top layer (PTL), formed as a rod portion (a) extending rearward from said ABS and a body portion (b) continuous with said rod portion and extending rearward to a termination;
   wherein said PTL layer is said source of optically generated plasmons and is configured for transferring said optically generated plasmons from said body portion to said rod portion, from which rod portion near-field energy from said plasmons strikes said recording medium;
   a thin template layer (TTL) contacting a lower surface of said rod region of said PTL layer, wherein said TTL stimulates a textured crystalline growth structure in said first region of said PTL layer that provides a large grainsize and resistance to thermal deformations;
   a planar plasmon generator bottom layer (PBL) contacting a lower surface of said body region of said PTL layer;
   a bottom stop dielectric (BSD) layer formed beneath said TTL to which said spacer layer adheres.

2. The writer of claim 1 wherein said TTL is a Zr xA/Au yA stack, in which the Zr thickness x is between approximately 2 A and 10 A and said Au thickness y is between approximately 10 A to 300 A and wherein said Zr is used as a seed layer to enhance Au film adhesion to a substrate.

3. The writer of claim 1 wherein said TTL is a Zr xA/Au yA/Rh zA stack is used as the TTL, in which said Zr thickness x is between approximately 2 A and 10 A, said Au thickness y is between approximately 10 A and 300 A, and said Rh thickness, z, is between approximately 20 A and 100 A and wherein said Zr is used as a seed layer to enhance Au film adhesion to a substrate.

4. The writer of claim 1 wherein said TTL provides an fcc template said PTL rod portion to produce a larger grain size and a stronger bonding between its atomic constituents.

5. A slider mounted writer, comprising:
   the writer of claim 1;
   a slider aerodynamically configured to support a PMR TAMR writer at a stable flying height (FH) above a rotating magnetic recording medium;
   said writer mounted on said slider.

6. A head gimbal assembly, comprising
   the slider mounted writer of claim 5;
   a suspension that elastically supports said slider-mounted writer, wherein said suspension has a flexure to which said slider-mounted writer is joined, a load beam with one end connected to said flexure and a base plate connected to the other end of said load beam.

7. A hard disk drive (HDD), comprising:
said head gimbal assembly of claim 6;
a magnetic recording medium positioned opposite to said slider;
a spindle motor that rotates and drives said magnetic recording medium;
a device that supports the slider and that positions said slider relative to said magnetic recording medium.

8. A method of forming a PMR writer configured for TAMR operation, comprising:
providing a substrate;
forming in said substrate a planar plasmon generator bottom layer (PBL), said layer extending from a position a first distance away from an ABS to a position a second distance away from said ABS;
planarizing an upper surface of said substrate and said PBL layer;
forming on said planarized upper surface a thin template layer (TTL) film;
using an etching process, removing all of said TTL film from a point beyond said first distance away from said ABS, thereby exposing an upper surface of said PBL layer and a portion of said substrate layer beyond said second distance away;
forming a planar plasmon generator top layer (PTL) film covering said remaining TTL film, and extending rearward over said exposed upper surface of said PBL layer and said substrate portion exposed beyond said second distance;
patterning said PTL film to form a necking rod portion and a parabolic body portion, wherein said necking rod portion extends from said ABS to cover said TTL and wherein said parabolic body portion extends beyond said TTL to cover said PBL and which may also cover remaining exposed substrate.

9. The method of claim 8 wherein said etching process is an ion-beam etch (IBE).

10. The method of claim 8 wherein said TTL layer is a Zr xA/Au yA stack, in which the Zr thickness x is between approximately 2 A and 10 A and said Au thickness y is between approximately 10 A to 300 A and wherein said Zr is used as a seed layer to enhance Au film adhesion to a substrate.

11. The method of claim 8 wherein said TTL layer is a Zr xA/Au yA/Rh zA stack is used as the TTL, in which said Zr thickness x is between approximately 2 A and 10 A, said Au thickness y is between approximately 10 A and 300 A, and said Rh thickness, z, is between approximately 20 A and 100 A and wherein said Zr is used as a seed layer to enhance Au film adhesion to a substrate.

12. The method of claim 8 wherein said substrate is a dielectric layer formed of Alumina or SiO2.

* * * * *